United States Patent
Carpenter et al.

(10) Patent No.: US 10,007,602 B2
(45) Date of Patent: Jun. 26, 2018

(54) FLASH COPY RELATIONSHIP MANAGEMENT

(71) Applicant: International Business Machines Corporation, Armonk, NY (US)

(72) Inventors: Preston A. Carpenter, Vail, AZ (US); Dash D. Miller, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 14/271,141

(22) Filed: May 6, 2014

(65) Prior Publication Data

US 2015/0324280 A1   Nov. 12, 2015

(51) Int. Cl.
*G06F 12/02*   (2006.01)
*G06F 3/06*   (2006.01)
*G06F 9/00*   (2006.01)

(52) U.S. Cl.
CPC ........ *G06F 12/0246* (2013.01); *G06F 3/0605* (2013.01); *G06F 3/067* (2013.01); *G06F 3/0631* (2013.01); *G06F 3/0634* (2013.01); *G06F 9/00* (2013.01); *G06F 2212/7208* (2013.01)

(58) Field of Classification Search
CPC . G06F 12/0246; G06F 8/71; G06F 2212/7208
USPC ......................................................... 711/103
See application file for complete search history.

(56) References Cited

U.S. PATENT DOCUMENTS

| | | | | |
|---|---|---|---|---|
| 3,862,615 A | * | 1/1975 | Liou | G09F 7/02 116/308 |
| 6,799,258 B1 | * | 9/2004 | Linde | G06F 11/1466 707/999.202 |
| 6,996,586 B2 | | 2/2006 | Stanley et al. | |
| 7,000,145 B2 | | 2/2006 | Werner et al. | |
| 7,024,530 B2 | * | 4/2006 | Jarvis | G06F 11/2069 707/999.202 |
| 7,047,390 B2 | | 5/2006 | Factor et al. | |
| 7,120,768 B2 | * | 10/2006 | Mizuno | G06F 3/0613 707/999.202 |
| 7,124,323 B2 | | 10/2006 | Sanchez et al. | |
| 7,240,131 B1 | * | 7/2007 | Bjornsson | G06F 3/0607 707/999.01 |
| 7,249,278 B2 | | 7/2007 | Fukuda | |
| 7,257,676 B2 | | 8/2007 | Corbett et al. | |
| 7,395,402 B2 | | 7/2008 | Wilson et al. | |
| 7,409,510 B2 | * | 8/2008 | Werner | G06F 11/2069 707/999.202 |
| 7,437,676 B1 | | 10/2008 | Magdum et al. | |

(Continued)

OTHER PUBLICATIONS

Garimella, Neeta, "Understanding and exploiting snapshot technology for data protection, Part 1: Snapshot technology overview" < IBMdeveloperWorks®, published Nov. 6, 2006 (http://www.ibm.com/developerworks/tivoli/library/t-snaptsm1/).*

(Continued)

*Primary Examiner* — Midys Rojas
(74) *Attorney, Agent, or Firm* — Kunzler, PC (57) ABSTRACT

For flash copy relationship management, a management module identifies a data unit in a flash copy relationship with an extent range using a flash copy table. A resolution module erases the flash copy relationship from the flash copy table in response to the flash copy relationship completing.

12 Claims, 7 Drawing Sheets

(56) References Cited

U.S. PATENT DOCUMENTS

| | | | |
|---|---|---|---|
| 7,461,100 B2 | 12/2008 | Spear et al. | |
| 7,467,266 B2 | 12/2008 | Burton et al. | |
| 7,523,408 B2 | 4/2009 | Barrios et al. | |
| 7,571,293 B1 | 8/2009 | LeCrone et al. | |
| 7,596,658 B2 | 9/2009 | Tsurudome | |
| 7,702,670 B1 | 4/2010 | Duprey et al. | |
| 7,702,866 B2 | 4/2010 | Beardsley et al. | |
| 7,716,185 B2 | 5/2010 | Thompson et al. | |
| 7,747,576 B2 | 6/2010 | Micka | |
| 8,140,785 B2* | 3/2012 | Kalos | G06F 3/061 711/161 |
| 8,161,253 B2* | 4/2012 | Suarez | G06F 3/0619 711/114 |
| 8,200,637 B1 | 6/2012 | Stringham | |
| 8,271,753 B2* | 9/2012 | Nemoto | G06F 11/1451 707/609 |
| 8,312,490 B2 | 11/2012 | Yap et al. | |
| 8,429,363 B2 | 4/2013 | Benhase et al. | |
| 8,433,867 B2 | 4/2013 | Eastman et al. | |
| 8,433,870 B2 | 4/2013 | Benhase et al. | |
| 8,468,316 B2* | 6/2013 | Beeken | G06F 11/1456 711/161 |
| 8,515,911 B1 | 8/2013 | Zhou et al. | |
| 8,572,045 B1 | 10/2013 | Shah | |
| 8,635,423 B1 | 1/2014 | Blumenau | |
| 8,655,841 B1 | 2/2014 | Shidharan | |
| 8,745,006 B2* | 6/2014 | Hiwatashi | G06F 11/2058 707/653 |
| 8,775,390 B2 | 7/2014 | Anglin et al. | |
| 8,793,290 B1 | 7/2014 | Pruthi et al. | |
| 8,806,281 B1* | 8/2014 | Dowers, II | G06F 11/328 714/46 |
| 8,832,028 B2 | 9/2014 | Susairaj et al. | |
| 8,874,532 B2 | 10/2014 | Anglin et al. | |
| 8,910,030 B2 | 12/2014 | Goel | |
| 8,914,578 B2 | 12/2014 | DeNeui et al. | |
| 9,483,355 B1* | 11/2016 | Meiri | G06F 11/1448 |
| 2003/0158869 A1* | 8/2003 | Micka | G06F 11/2074 |
| 2003/0177149 A1 | 9/2003 | Coombs | |
| 2004/0073831 A1 | 4/2004 | Yanai et al. | |
| 2004/0243778 A1* | 12/2004 | Barrios | H04L 29/06 711/165 |
| 2004/0243945 A1 | 12/2004 | Benhase et al. | |
| 2004/0260869 A1* | 12/2004 | Factor | G06F 3/0614 711/112 |
| 2004/0267706 A1* | 12/2004 | Springer, Sr. | G06F 3/061 |
| 2005/0235337 A1 | 10/2005 | Wilson et al. | |
| 2006/0161721 A1* | 7/2006 | Iwamura | G06F 11/2064 711/100 |
| 2006/0174003 A1 | 8/2006 | Wilson et al. | |
| 2006/0212667 A1* | 9/2006 | Mikami | G06F 3/0613 711/162 |
| 2006/0218370 A1* | 9/2006 | Satoyama | G06F 3/0605 711/170 |
| 2007/0083710 A1 | 4/2007 | Corbett et al. | |
| 2007/0180204 A1 | 8/2007 | Wilson | |
| 2007/0220322 A1* | 9/2007 | Mikami | G06F 11/324 714/13 |
| 2008/0005146 A1* | 1/2008 | Kubo | G06F 3/061 |
| 2009/0228658 A1* | 9/2009 | Nagai | G06F 12/0866 711/129 |
| 2011/0167044 A1* | 7/2011 | Hiwatashi | G06F 11/2058 707/652 |
| 2011/0167234 A1* | 7/2011 | Nishibori | G06F 11/1456 711/162 |
| 2011/0191299 A1* | 8/2011 | Huynh Huu | G06F 17/30 707/646 |
| 2011/0307660 A1 | 12/2011 | Yang | |
| 2012/0089795 A1 | 4/2012 | Benhase et al. | |
| 2012/0216009 A1* | 8/2012 | Benhase | G06F 3/0655 711/206 |
| 2012/0221823 A1 | 8/2012 | Benhase et al. | |
| 2012/0260051 A1* | 10/2012 | Maki | G06F 3/0611 711/162 |
| 2013/0054531 A1 | 2/2013 | Susairaj et al. | |
| 2013/0054545 A1 | 2/2013 | Anglin et al. | |
| 2013/0054906 A1 | 2/2013 | Anglin et al. | |
| 2013/0254833 A1 | 9/2013 | Nicodemus et al. | |
| 2013/0290626 A1 | 10/2013 | Sundrani | |
| 2013/0339297 A1 | 12/2013 | Chen | |
| 2013/0339302 A1 | 12/2013 | Zhang et al. | |
| 2013/0339303 A1 | 12/2013 | Potter et al. | |
| 2013/0339319 A1 | 12/2013 | Woodward et al. | |
| 2013/0339471 A1 | 12/2013 | Bhargava et al. | |
| 2013/0339643 A1 | 12/2013 | Tekade et al. | |
| 2014/0052952 A1 | 2/2014 | Anglin et al. | |
| 2014/0089581 A1 | 3/2014 | DeNeui et al. | |
| 2016/0259574 A1 | 9/2016 | Carpenter | |

OTHER PUBLICATIONS

VMware, "VMWare Infrastructure 3 SAN Conceptual and Design Basics", published Mar. 9, 2006, 14 pages, (https://www.vmware.com/pdf/esx_san_cfg_technote.pdf).*

ISPF—Allocating a New Data Set, published by Western Illinois University in 2001, retrieved online Jun. 27, 2017 (https://mvs.wiu.edu/stumvs/TSO/ISPFAllocateDataSet.html) hereinafter "WIU", pp. 1-6.*

"Query Flashcopy," z/VM V5R4.0 CP Commands and Utilities Reference, SC24-608107, http://publib.boulder.ibm.com/infocenter/zvm/v5r4/index.jsp topic=/com.ibm.zvm.v54.hcpb7/qflashcy.htm , 6 pages.

U.S. Appl. No. 14/637,151 Office Action Summary, dated Apr. 25, 2016.

Webopedia, "Wildcard Character", Oct. 1, 2002, pp. 1, https://web.archive.org/web/20021001193432/http://www.webopedia.com/TERM/W/wildcard_character.html.

U.S. Appl. No. 14/637,151 Office Action Summary, dated Sep. 9, 2016.

ViceVersa, About Synchronization (One-Way, Two-Way), Backup and Replication, May 13, 2008, pp. 1-4, https://web.archive.or/web/200805135005/http://www.tgrmn.com/web/kb/item78.htm.

ViceVersa, "What is the Difference Between One-Way and Two-Way Synchronization?", Oct. 13, 2005, pp. 1-2, https://web.archive.org/web/20051013085336/http://www.tgrmn.com/web/kb/item34.htm.

Synametrics Technologies, "Two-Way File Synchronization", Jan. 27, 2011, pp. 1-2, https://web.archive.org/web/20110127120735/http://web.synametrics.com/SyncrifyTwoWaySync.htm.

Comodo Group, "Selecting the Backup Format", Jun. 3, 2014, pp. 1-3, https://web.archive.org/web/20140603022324/http://help.comodo.com/topic-9-1-455-4994-.html.

U.S. Appl. No. 14/637,151 Office Action Summary, dated Jan. 4, 2017.

U.S. Appl. No. 14/637,151 Office Action Summary, dated Apr. 27, 2017.

U.S. Appl. No. 14/637,151 Office Action Summary, dated Dec. 21, 2017.

U.S. Appl. No. 14/637,151 Office Action Summary, dated Aug. 10, 2017.

HighPoint Technologies, Inc., "Expanding Storage Capacity—A Primer", Oct. 22, 2007, pp. 1-3, https://web.archive.org/web/20071022225100/http://www.highpoint-tch.com/PDF/Expanding_Storage_Capacity-A_Primer_pdf.

Microsemi, "How to Use Online Capacity Expansion (OCE) with an Adaptec Raid Controller?", Jun. 28, 2002, pp. 1-2, http://ask.mictosemi.com/app/answers/detail/a_id/3883/~/how-to-use-online-capacity-expansion-%28oce%29-with-an-adaptec-raid-controller-%3F.

QNAP, "Oneline Raid Level Migration", Apr. 22, 2013, p. 1-5, https://www.quap.com/en/how-to/tutorial/artical/online-raid-level-migration.

* cited by examiner

| Data Unit ID 205 | Extent Range 210 | Flash Copy Status 215 | Unit Information 220 |
|---|---|---|---|
| Data Unit ID 205 | Extent Range 210 | Flash Copy Status 215 | Unit Information 220 |

221 points to each row.

| Data Set Name 225 |
|---|
| Extent Data 230 |
| List of Extent Ranges 255 |

FLASH COPY RELATIONSHIP MANAGEMENT

FIELD

The subject matter disclosed herein relates to flash copy relationships and more particularly relates to flash copy relationship management.

BACKGROUND

Flash copy relationships are often established in order to back up data units. An administrator may subsequently need to manage a flash copy relationship.

BRIEF SUMMARY

A method for flash copy relationship management is disclosed. A management module identifies a data unit in a flash copy relationship with an extent range using a flash copy table. A resolution module erases the flash copy relationship from the flash copy table in response to the flash copy relationship completing. An apparatus and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a method, an apparatus, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The description of elements in each figure may refer to elements of proceeding figures. Like numbers refer to like elements in all figures, including alternate embodiments of like elements.

Figure 1:
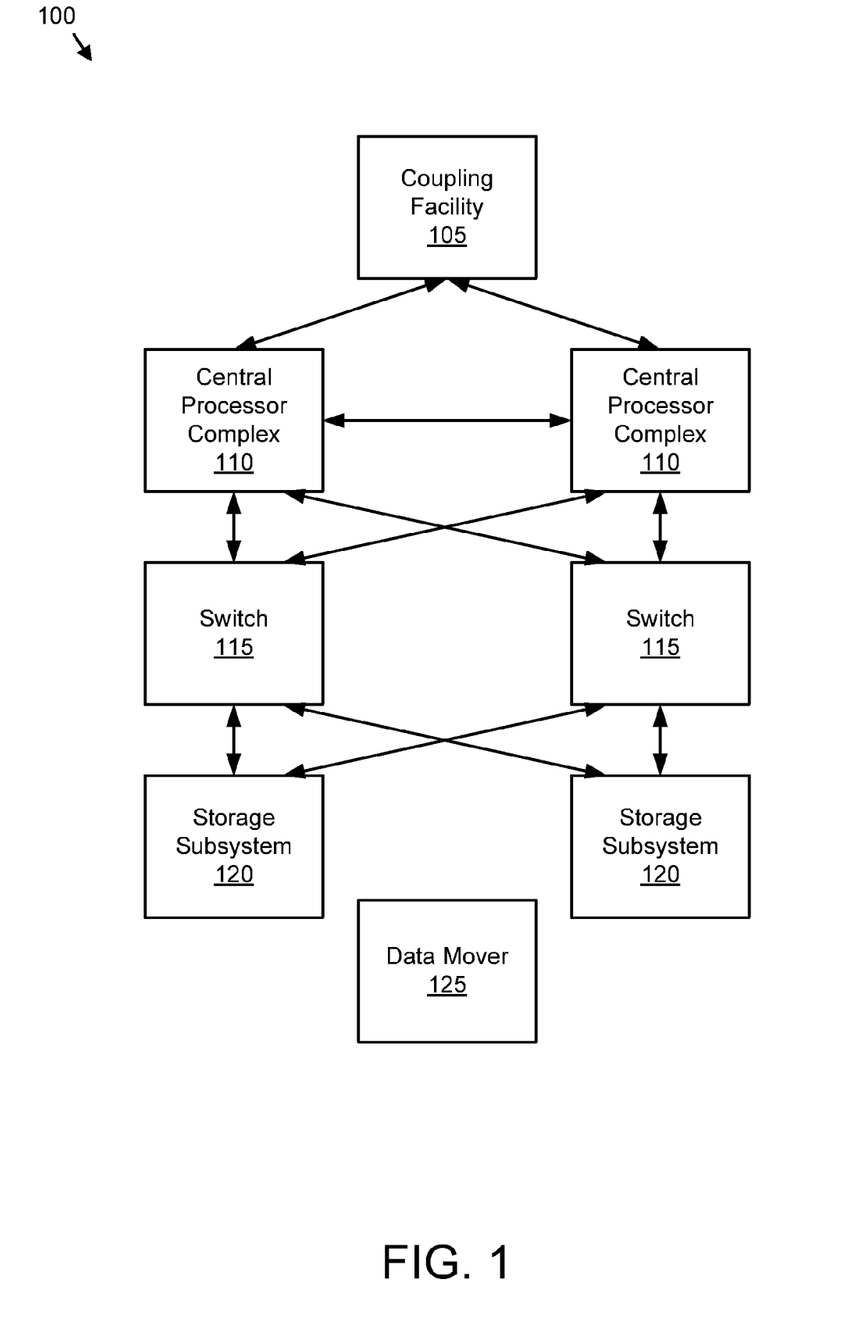
FIG. 1 is a schematic block diagram illustrating one embodiment of a data processing system.

FIG. 1 is a schematic block diagram illustrating one embodiment of a data processing system 100. The data processing system 100 may be a system complex or sysplex of multiple central processor complexes 110 manufactured by International Business Machines (IBM) of Armonk, N.Y. Each of the central processor complexes 110 may execute a Z/OS® operating system from IBM. The system 100 may include one or more central processor complexes 110, one or more switches 115, one or more storage subsystems 120, a coupling facility 105, and a data mover 125.

The central processor complexes 110 may be mainframe computers and may each comprise one or more processors. The coupling facility 105 may facilitate the processors of each central processor complex 110 accessing common data.

The storage subsystems 120 may comprise one or more storage controllers and one or more storage devices including hard disk drives, semiconductor storage devices, optical storage devices, micromechanical storage devices, and combinations thereof. The storage subsystems 120 may store data for the central processor complexes 110. The switches 115 may route the data from the storage subsystems 120 to the central processor complexes 110. In one embodiment, the data mover 125 may manage data transfers.

The data in the storage subsystems 120 may be stored on extents. An extent may be a contiguous area of storage on a storage device. One or more extents may be organized as a data set. Alternatively, one or more extents maybe organized as a volume. A volume may include one or more data sets.

Flash copy relationships may be established between a data set or volume on the first storage subsystem 120 and the second storage subsystem 120. The flash copy relationships may create point-in-time snapshot copies of the data sets or volumes. The flash copy relationships may be established by FLASHCOPY® software manufactured by IBM.

Currently, after a flash copy relationship is established, the flash copy relationship can only be found by querying individual extent ranges, making managing flash copy relationships difficult. The embodiments described herein identify a data unit such as a data set, volume, and/or extent in a flash copy relationship with an extent range using a flash copy table as will be described hereafter. The flash copy table is used to automatically manage the flash copy relationships of the system 100. The embodiments may further erase the flash copy relationship from the flash copy of table in response to the flash copy relationship completing as will be described hereafter.

Figure 2A:
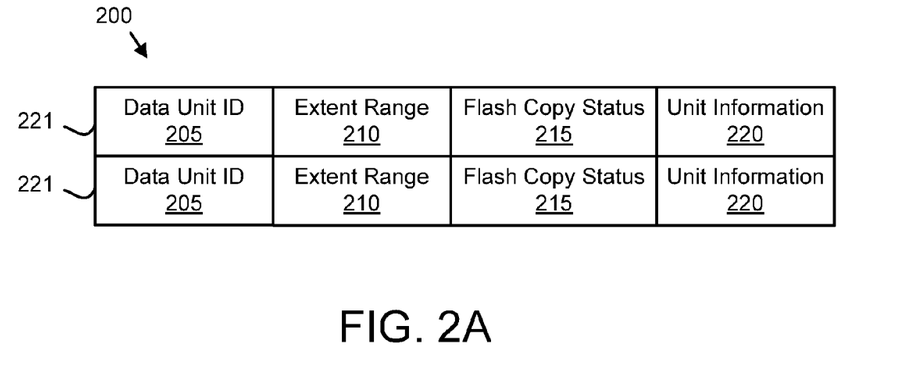
FIG. 2A is a schematic block diagram illustrating one embodiment of a flash copy table.

FIG. 2A is a schematic block diagram illustrating one embodiment of the flash copy table 200. The flash copy table 200 maybe organized as a data structure, a database, or the like. The flash copy table 200 may be stored in the coupling facility 105. Alternatively, the flash copy table 200 may be stored in the coupling facility 105, one or more central processor complexes 110, one or more storage subsystems 120, or combinations thereof.

The flash copy table 200 includes a plurality of entries 221. Each entry 221 describes a flash copy relationship. In the depicted embodiment, each entry 221 includes a data unit identifier 205, an extent range 210, a flash copy status 215, and unit information 220. The data unit identifier 205 may uniquely identify the data unit of the flash copy relationship. In one embodiment, the data unit identifier 205 is an index to the flash copy table database and/or data structure.

The extent range 210 may describe a range of extents in the storage subsystems 120 that receive the point-in-time copy of the data unit. The flash copy status 215 may describe a status of the flash copy relationship. The flash copy status 215 may be active, indicating that the extent range 210 is periodically receiving the point-in-time copy of the data unit. Alternatively, the flash copy status 215 may be completed, indicating that the extent range 210 has received the point-in-time copy of the data unit. In one embodiment, the flash copy status 215 is withdrawn, indicating that the extent range 210 will no longer receive the point-in-time copy of the data unit.

The unit information 220 may describe the data unit. The unit information 220 is dependent upon the type of the data unit. The unit information 220 for a data set data unit, a volume data unit, and an extent data unit are described hereafter in FIGS. 2B-D.

Figure 2B:
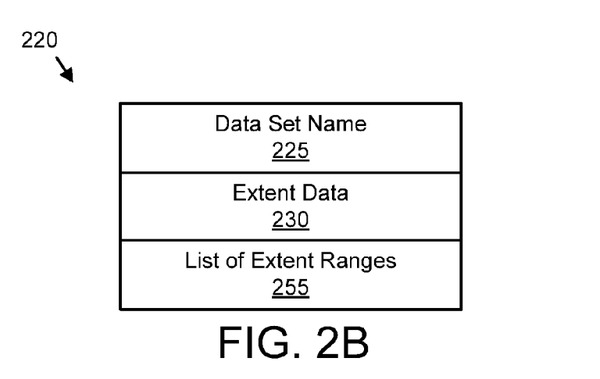
FIG. 2B is a schematic block diagram illustrating one embodiment of data set unit information.

FIG. 2B is a schematic block diagram illustrating one embodiment of data set unit information 220. In the depicted embodiment, the unit information 220 describes a data set. The unit information 220 includes a data set name 225, extent data 230, and a list of extent ranges 255.

The data set name 225 may be the logical name for the data set. The extent data 230 may include a box serial number, a logical control unit (LCU), and/or a common cryptographic architecture (CCA) for the extent range 210. The list of extent ranges 255 may include a listing of extent ranges if the extent range 210 is broken into multiple non-contiguous ranges.

Figure 2C:
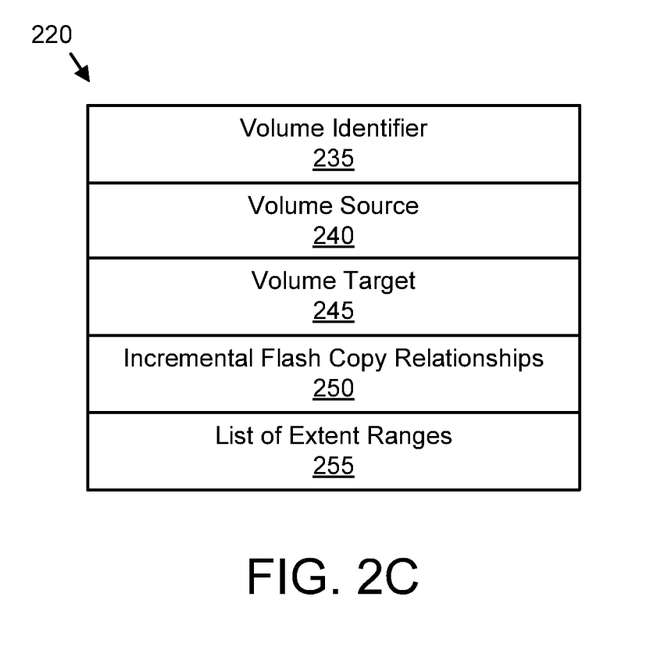
FIG. 2C is a schematic block diagram illustrating one embodiment of volume unit information.

FIG. 2C is a schematic block diagram illustrating one embodiment of volume unit information 220. In the depicted embodiment, the unit information 220 describes a volume. The unit information 220 includes a volume identifier 235, a volume source 240, a volume target 245, incremental flash copy relationships 250, and a list of extent ranges 255.

The volume identifier 235 may uniquely identify the volume. The volume source 240 may identify the volume of which the point-in-time copy is created. The volume target 245 may identify the volume in which the point-in-time copy is stored. The incremental flash copy relationships 250 may describe each incremental flash copy relationship for the volume. The list of extent ranges 255 may include a listing of extent ranges if the extent range 210 is broken into multiple non-contiguous ranges.

Figure 2D:
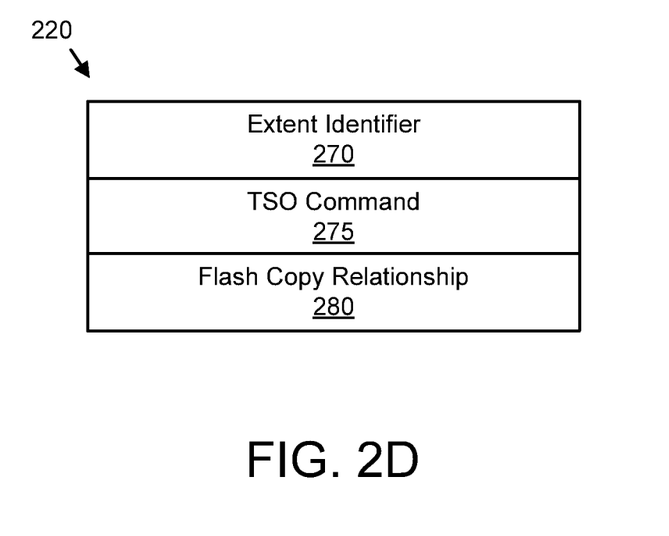
FIG. 2D is a schematic block diagram illustrating one embodiment of extent unit information.

FIG. 2D is a schematic block diagram illustrating one embodiment of extent unit information 220. In the depicted embodiment, the unit information 220 describes an extent. The unit information 220 may include an extent identifier 270, a time sharing option (TSO) command 275, and a flash copy relationship 280. The extent identifier 270 may be a physical address of the extent. The TSO command 275 may record the TSO command that created the extent. The flash copy relationship 280 may describe a flash copy relationship that includes the extent. In one embodiment, the flash copy relationship 280 records the data unit identifier 205 of the flash copy table 200.

Figure 3A:
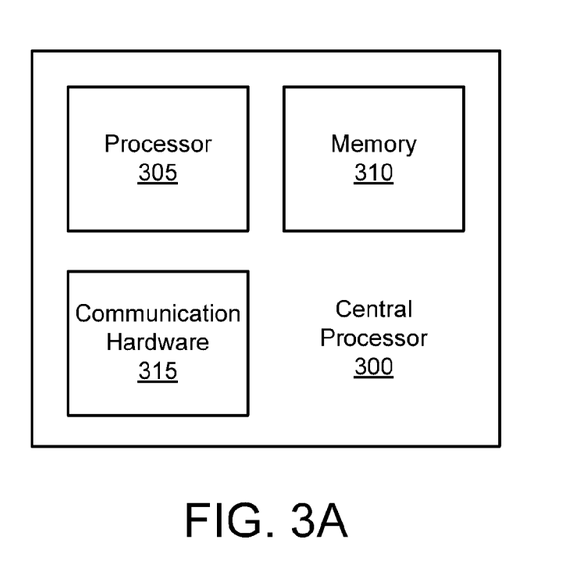
FIG. 3A is a schematic block diagram illustrating one embodiment of a central processor.

FIG. 3A is a schematic block diagram illustrating one embodiment of a central processor 300 of a central processor complex 110. Each central processor complex 110 may include a plurality of central processors 300. The central processor 300 includes a processor 305, a memory 310, and communication hardware 315. The memory 310 may be a semiconductor storage device. The memory 310 may store executable code. The processor 305 may execute the executable code. The communication hardware 315 may communicate with other processor complexes 300 and/or central processor complexes 110.

Figure 3B:
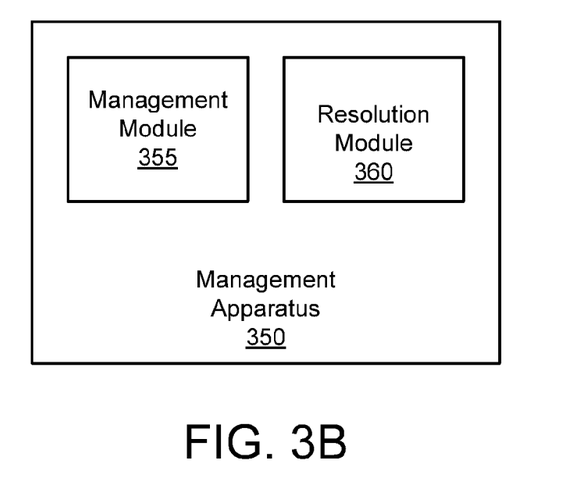
FIG. 3B is a schematic block diagram illustrating one embodiment of a management apparatus.

FIG. 3B is a schematic block diagram illustrating one embodiment of a management apparatus 350. The apparatus 350 includes a management module 355 and a resolution module 360. Each module may comprise one or more of hardware and executable code, the executable code stored on one or more computer readable storage media such as the memory 310 and/or the storage subsystem 120.

The management unit 355 may identify a data unit in a flash copy relationship with an extent range 210 using the flash copy table 200. The resolution module 360 may erase the flash copy relationship from the flash copy table 200 in response to the flash copy relationship completing.

Figure 4A:
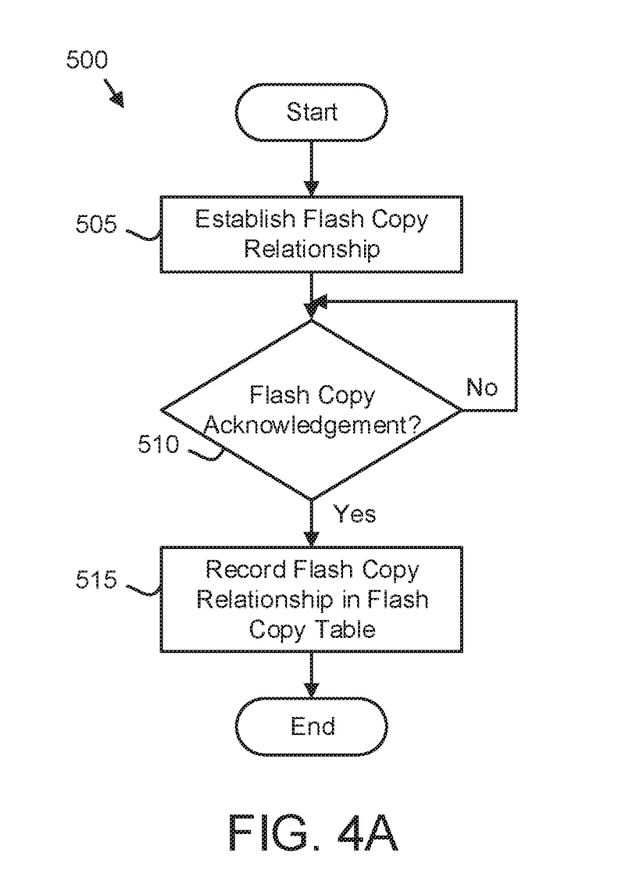
FIG. 4A is a schematic flow chart diagram illustrating one embodiment of a flash copy table creation method.

FIG. 4A is a schematic flow chart diagram illustrating one embodiment of a flash copy table creation method 500. The method 500 may create the flash copy table 200. The method 500 may be performed using a processor 305. Alternatively, the method 500 may be performed by a computer program product. The computer program product may comprise a computer readable storage medium having program instructions embodied therein. The computer readable storage medium may be the memory 310, the storage subsystem 120, or combinations thereof. The program instructions may be readable/executable by the processor 305 to perform the method 500.

The method 500 starts, and in one embodiment, the management module 355 establishes 505 a flash copy relationship between the data unit and an extent range. The management module 355 may communicate the flash copy relationship to a storage subsystem 120. The management module 355 may further determine 510 if the data mover 125 receives a flash copy acknowledgment from the storage subsystem 120. If the data mover 125 does not receive the flash copy acknowledgment, the manager module 355 continues to determine 510 if the data mover 125 receives the flash copy acknowledgment.

If the data mover 125 receives the flash copy acknowledgment, the management module 355 may record 515 the flash copy relationship in the flash copy table 200 and the method 500 ends. In one embodiment, the management module 355 creates an entry 221 in the flash copy table 200. The management module 355 may record the identity of the data unit in a unit information 220. In addition, the management module 355 may record the extent range in the extent range 210 of the flash copy table 200. In one embodiment, the management module 355 records the flash copy status 215 as active. The entry 221 may embody the flash copy relationship.

Figure 4B:
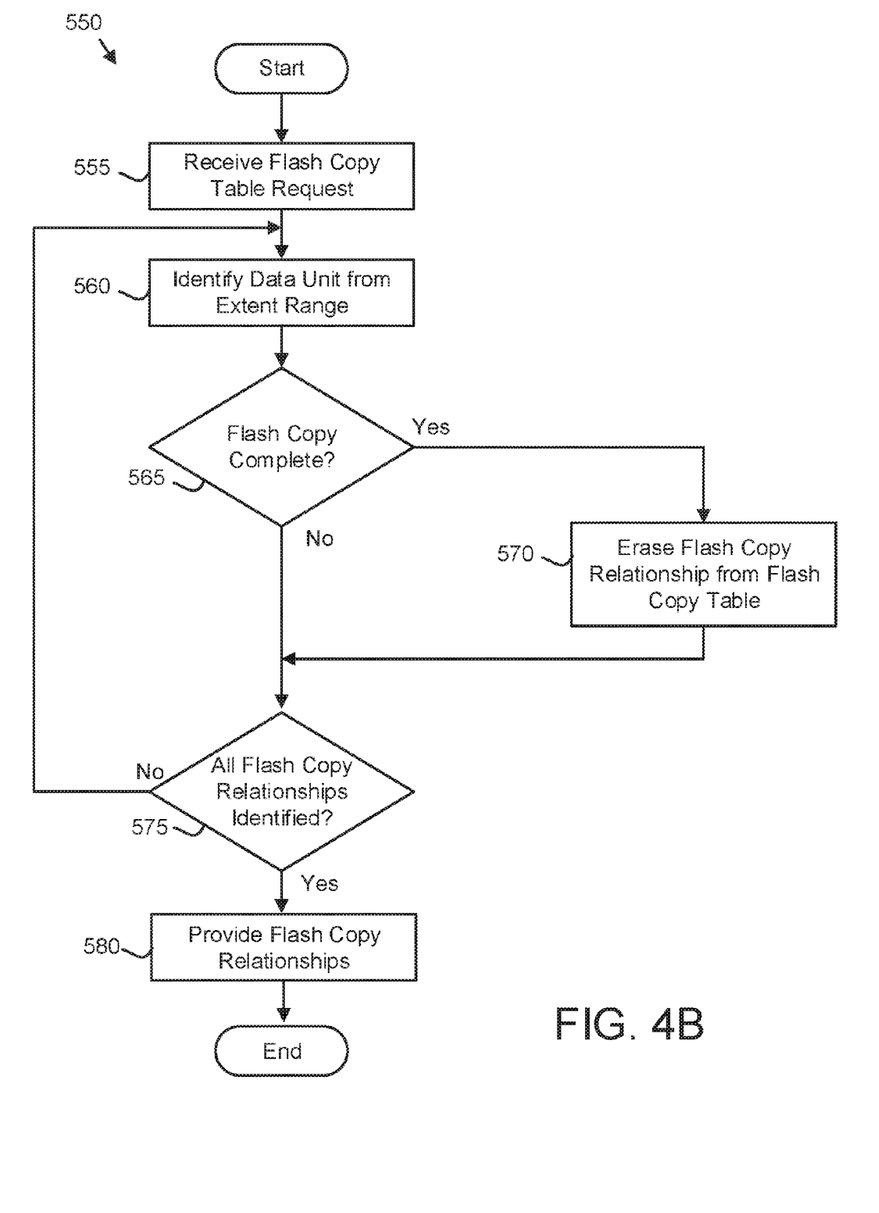
FIG. 4B is a schematic flow chart diagram illustrating one embodiment of a flash copy table provision method.

FIG. 4B is a schematic flow chart diagram illustrating one embodiment of a flash copy table provision method 550. The method 550 may provide the flash copy relationships from the flash copy table 200. The method 550 may be performed using a processor 305. Alternatively, the method 550 may be performed by a computer program product. The computer program product may comprise a computer readable storage medium having program instructions embodied therein. The computer readable storage medium may be the memory 310, the storage subsystem 120, or combinations thereof. The program instructions may be readable/executable by the processor 305 to perform the method 550.

The method 550 starts, and in one embodiment, the resolution module 360 receives 555 a flash copy table request. The flash copy table request may be generated by the administrator. Alternatively, the flash copy table request may be generated by a maintenance program.

The resolution module 360 may identify 560 a data unit from the extent range 210 in response to the flash copy table request. In one embodiment, the resolution module 360 scans each flash copy table entry 221 in turn, retrieves the extent range 210, and identifies 560 the data unit in a flash copy relationship with the extent range 210. Alternatively, the resolution module 360 may sequentially scan extents in the storage subsystem 120 and identify data units in the flash copy relationship with the extents.

The resolution module 360 may further determine 565 if the flash copy relationship between the extent range 210 and the data unit is complete. If the flash copy relationship is complete, the resolution module 360 may erase 570 the flash copy relationship from the flash copy table 200 by erasing the entry 221 for the flash copy relationship.

After erasing 570 the flash copy relationship or if the flash copy relationship is not complete, the resolution module 360 may determine 575 if all flash copy relationships have been identified. In one embodiment, all flash copy relationships have been identified if all entries 221 in the flash copy table 200 have been scanned. Alternatively, all flash copy relationships may have been identified if all extents in the storage subsystems 120 have been scanned.

If all flash copy relationships have not been identified, the resolution module 360 identifies 560 a data unit from a next extent range 210. If all flash copy relationships have been identified, the resolution module 360 provides 580 the flash copy relationships and the method 550 ends. In one embodiment, the resolution module 360 displays the flash copy relationships of the flash copy table 200 for an administrator.

Figure 4C:
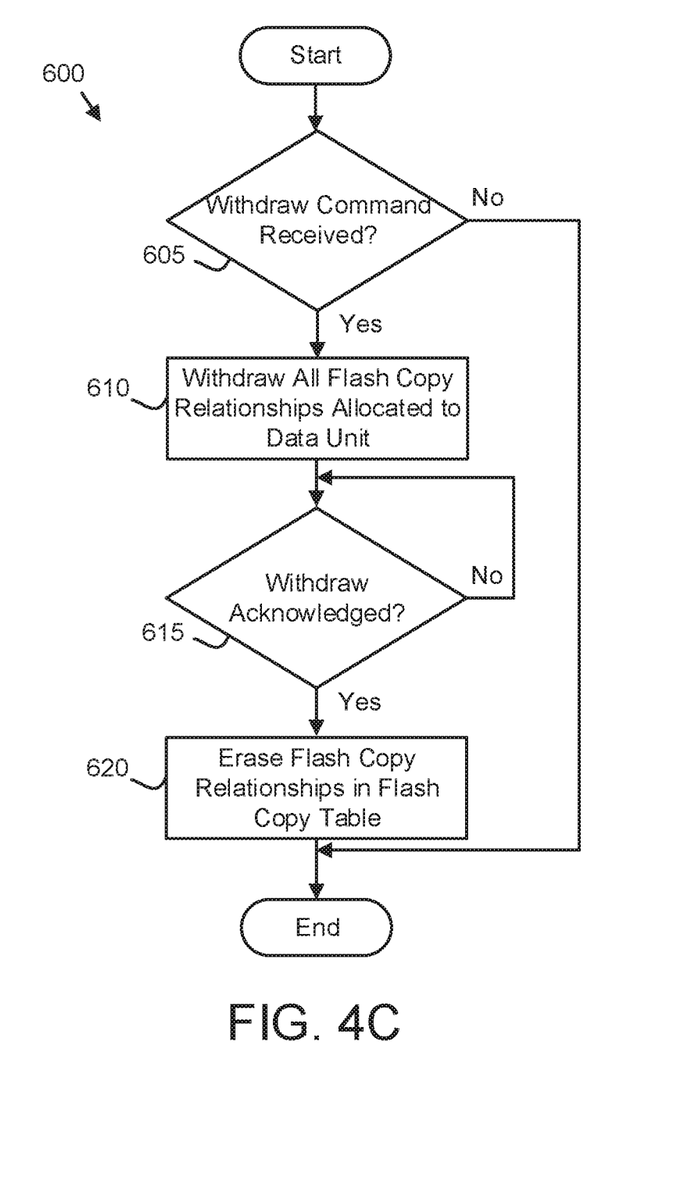
FIG. 4C is a schematic flow chart diagram illustrating one embodiment of a flash copy relationship withdraw method.

FIG. 4C is a schematic flow chart diagram illustrating one embodiment of a flash copy relationship withdraw method. The method 600 may be performed using a processor 305. Alternatively, the method 600 may be performed by a computer program product. The computer program product may comprise a computer readable storage medium having program instructions embodied therein. The computer readable storage medium may be the memory 310, the storage subsystem 120, or combinations thereof. The program instructions may be readable/executable by the processor 305 to perform the method 600.

The method 600 starts, and in one embodiment, the resolution module 360 determines 605 if a withdraw command is received. The withdraw command may be received from an administrator in response to the display of the flash copy table 200. For example, flash copy relationships between data units and extent ranges 210 may be displayed along with the flash copy status 215 for each flash copy relationship. An administrator may have the option to withdraw each flash copy relationship by issuing the withdraw command. If the withdraw command is not received, the method 600 ends.

If the withdraw command is received, the resolution module 360 may withdraw 610 at least one flash copy relationship allocated to a data unit identified by the withdraw command. In one embodiment, the resolution module 360 directs the storage subsystems 120 to withdraw all flash copy relationships allocated to the data unit.

Alternatively, the resolution module 360 may withdraw 610 all flash copy relationships allocated to a data unit in response to both the flash copy relationship for the data unit not completing and receiving 605 the withdraw command. In one embodiment, only uncompleted flash copy relationships are withdrawn in response to the withdraw command.

The resolution module 360 may determine 615 if the withdraw is acknowledged by the storage subsystems 120. The storage subsystems 120 may acknowledge the withdraw by communicating a withdraw acknowledgment message. If the withdraw is not acknowledged, the resolution module 360 may wait for the withdraw acknowledgment.

If there withdraws acknowledged, the resolution module 360 may erase 620 the flash copy relationships for the data unit in the flash copy table 200 and the method 600 ends. In one embodiment, the resolution module 360 erases 620 each flash copy table entry 221 that includes the data unit.

The embodiments automatically identify a data unit in a flash copy relationship with an extent range using the flash copy table 200. As a result, an administrator can rapidly determine all of the existing flash copy relationships in the system 100. In addition, the embodiments may automatically erase the flash copy relationship from the flash copy table 200 if the flash copy relationship is completed. Thus maintenance of the flash copy table 200 and the flash copy relationships is simplified.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for flash copy relationship management comprising:

receiving, by use of a processor, a time sharing option (TSO) command;

creating an extent range in response to the TSO command;

establishing a flash copy relationship between a data unit and the extent range in a storage subsystem of a plurality of storage subsystems in a coupling facility comprising a plurality of central processor complexes, the plurality of storage subsystems, and a plurality of switches, wherein the plurality of central processor complexes each access the data unit through the plurality of switches and a data mover manages data transfers from the plurality of storage subsystems through the plurality of switches to the plurality of central processor complexes based on the TSO command;

in response the data mover receiving a flash copy acknowledgement from a storage subsystem, recording the flash copy relationship between the data unit and the extent range in a flash copy table, wherein the flash copy relationship is recorded and wherein an entry for the data unit in the flash copy table comprises a data unit identifier, the extent range, a flash copy status, and unit information, and wherein if the data unit is a data set data unit, the unit information comprises a data set name, extent data, and a list of extent ranges, if the data unit is a volume data unit, the unit information comprises a volume unit identifier, a volume source, a volume target, incremental flash copy relationships, and the list of extents, and if the data unit is an extent data unit, the unit information comprises an extent identifier, the TSO command, and a description of the flash copy relationship;

identifying the data unit in the flash copy relationship with the extent range using the flash copy table; and in response to identifying the data unit using the flash copy table, erasing the entry for the data unit from the flash copy table in response to the flash copy relationship being complete, wherein the flash copy relationship is complete in response to receiving a point-in-time copy of the data unit.

2. The method of claim 1, the method further comprising:

withdrawing the flash copy relationship of the volume in response to a withdraw command; and erasing the entry for the volume from the flash copy table in response to a withdraw acknowledgement.

3. The method of claim 1, the method further comprising receiving a flash copy table request.

4. The method of claim 1, wherein the flash copy table further comprises extent data for the volume.

5. The method of claim 1, wherein the flash copy table further comprises an extent identifier of an extent unit in the extent range, and the flash copy relationship for a volume of the extent unit.

6. The method of claim 1, wherein the flash copy table is stored in a coupling facility.

7. An apparatus comprising:

a processor;

a memory storing code executable by the processor to:

receive a time sharing option (TSO) command;

create an extent range in response to the TSO command;

establish a flash copy relationship between a data unit and the extent range in a storage subsystem of a plurality of storage subsystems in a coupling facility comprising a plurality of central processor complexes, the plurality of storage subsystems, and a plurality of switches, wherein the plurality of central processor complexes each access the data unit through the plurality of switches and a data mover manages data transfers from the plurality of storage subsystems through the plurality of switches to the plurality of central processor complexes based on the TSO command;

in response the data mover receiving a flash copy acknowledgement from a storage subsystem, record the flash copy relationship between the data unit and the extent range in a flash copy table, wherein the flash copy relationship is recorded and wherein an entry for the data unit in the flash copy table comprises a data unit identifier, the extent range, a flash copy status, and unit information, and wherein if the data unit is a data set data unit, the unit information comprises a data set name, extent data, and a list of extent ranges, if the data unit is a volume data unit, the unit information comprises a volume unit identifier, a volume source, a volume target, incremental flash copy relationships, and the list of extents, and if the data unit is an extent data unit, the unit information comprises an extent identifier, the TSO command, and a description of the flash copy relationship;

identify the data unit in the flash copy relationship with the extent range using the flash copy table; and in response to identifying the data unit using the flash copy table, erase the entry for the data unit from the flash copy table in response to the flash copy relationship being complete, wherein the flash copy relationship is complete in response to receiving a point-in-time copy of the data unit.

8. The apparatus of claim 7, the processor further:

withdraws the flash copy relationship of the volume in response to a withdraw command; and erases the entry for the volume from the flash copy table in response to a withdraw acknowledgement.

9. The apparatus of claim 7, wherein the flash copy table further comprises an extent identifier of an extent unit in the extent range, and the flash copy relationship for a volume of the extent unit.

10. A computer program product for flash copy relationship management, the computer program product comprising a computer readable storage medium having program instructions embodied therewith, the program instructions readable/executable by a processor to cause the processor to:

receiving a time sharing option (TSO) command;

creating an extent range in response to the TSO command;

establishing a flash copy relationship between a data unit and the extent range in a storage subsystem of a plurality of storage subsystems in a coupling facility comprising a plurality of central processor complexes, the plurality of storage subsystems, and a plurality of switches, wherein the plurality of central processor complexes each access the data unit through the plurality of switches, and a data mover manages data transfers from the plurality of storage subsystems through the plurality of switches to the plurality of central processor complexes based on the TSO command;

in response the data mover receiving a flash copy acknowledgement from a storage subsystem, recording the flash copy relationship between the unit and the extent range in a flash copy table, wherein the flash copy relationship is recorded and wherein an entry for the data unit in the flash copy table comprises a data unit identifier, the extent range, a flash copy status, and unit information, and wherein if the data unit is a data set data unit, the unit information comprises a data set name, extent data, and a list of extent ranges, if the data unit is a volume data unit, the unit information comprises a volume unit identifier, a volume source, a volume target, incremental flash copy relationships, and the list of extents, and if the data unit is an extent data unit, the unit information comprises an extent identifier, the TSO command, and a description of the flash copy relationship;

identifying the data unit in the flash copy relationship with the extent range using the flash copy table; and in response to identifying the data unit using the flash copy table, erasing the entry for the data unit from the flash copy table in response to the flash copy relationship being complete, wherein the flash copy relationship is complete in response to receiving a point-in-time copy of the data unit.

11. The computer program product of claim 10, the processor further:

withdrawing the flash copy relationship of the volume in response to both the flash copy relationship not completing and a withdraw command; and erasing the entry for the volume from the flash copy table in response to a withdraw acknowledgement.

12. The computer program product of claim 10, wherein the flash copy table further comprises an extent identifier of an extent unit in the extent range, and the flash copy relationship for a volume of the extent unit.

* * * * *